(12) United States Patent
Yanagisawa et al.

(10) Patent No.: US 8,915,666 B2
(45) Date of Patent: Dec. 23, 2014

(54) TAPER COUPLING STRUCTURE AND ROTATING MACHINE

(75) Inventors: Eiichi Yanagisawa, Tokyo (JP); Satoru Yoshida, Hiroshima (JP); Masanao Fujii, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 417 days.

(21) Appl. No.: 13/320,832

(22) PCT Filed: Nov. 18, 2010

(86) PCT No.: PCT/JP2010/006760
§ 371 (c)(1),
(2), (4) Date: Dec. 12, 2011

(87) PCT Pub. No.: WO2011/101937
PCT Pub. Date: Aug. 25, 2011

(65) Prior Publication Data
US 2012/0093579 A1  Apr. 19, 2012

(30) Foreign Application Priority Data
Feb. 18, 2010 (JP) .................................. 2010-033523

(51) Int. Cl.
*F16D 1/06* (2006.01)
*B63H 23/34* (2006.01)
*F16D 1/092* (2006.01)
*F16D 1/09* (2006.01)

(52) U.S. Cl.
CPC .............. *B63H 23/34* (2013.01); *F16D 1/092* (2013.01); *F16D 2001/0906* (2013.01)
USPC ........................................................ 403/1

(58) Field of Classification Search
CPC ............ F16D 1/09; F16D 1/091; F16D 1/092
USPC .......... 403/1, 11, 15, 16, 31, 192, 242, 374.1
See application file for complete search history.

(56) References Cited

U.S. PATENT DOCUMENTS 2,318,051 A * 5/1943 Brace .............................. 403/27
8,302,754 B2 * 11/2012 Yagi et al. ..................... 192/66.2

(Continued)

FOREIGN PATENT DOCUMENTS

| JP | 52-24180 | 2/1977 |
| JP | 54-028959 | 3/1979 |

(Continued)

OTHER PUBLICATIONS

International Search Report issued Feb. 22, 2011 in International (PCT) Application No. PCT/JP2010/006760.

(Continued)

*Primary Examiner* — Michael P Ferguson
*Assistant Examiner* — Daniel Wiley
(74) *Attorney, Agent, or Firm* — Wenderoth, Lind & Ponack, L.L.P.

(57) ABSTRACT

A taper coupling structure includes a groove, serving as a hollowed part, provided in a rear end surface of a hub. The groove is formed continuously in the circumferential direction and uniformly in the radial direction. In the state in which a taper shaft is fitted in the hub, the groove interferes with the taper shaft in the radial direction. An inner shell part, which is a portion on the inside of the groove in the radial direction, has a low radial rigidity because of the presence of the groove. For this reason, if a force is applied from the hollow portion of a flange part toward the outside in the radial direction, the diameter of the inner shell part is liable to be increased in the radial direction by elastic displacement (deflection).

5 Claims, 9 Drawing Sheets (56) References Cited

U.S. PATENT DOCUMENTS

2009/0028630 A1* 1/2009 Kemmler et al. .......... 403/1
2009/0324323 A1 12/2009 Yamashita et al.

FOREIGN PATENT DOCUMENTS

| JP | 54-123654 | 9/1979 |
|---|---|---|
| JP | 3054261 | 11/1998 |
| JP | 2008-025596 | 2/2008 |
| JP | 2010-185525 | 8/2010 |

OTHER PUBLICATIONS

International Preliminary Report on Patentability and Written Opinion of the International Searching Authority issued Sep. 27, 2012 in International (PCT) Application No. PCT/JP2010/006760.

* cited by examiner

TAPER COUPLING STRUCTURE AND ROTATING MACHINE

TECHNICAL FIELD

The present invention relates to a taper coupling structure in which a shaft having a tapered part at the outer periphery thereof is fitted in a hub having a tapered hollow portion at the inner periphery thereof.

BACKGROUND ART

Couplings are known as machine elements for transmitting the output of a prime remover to a driven machine. Among these couplings, there is known a coupling in which the output shaft (hereinafter, referred to as the "taper shaft") of prime mover, in which the outer periphery of the shaft end portion is formed into a tapered shape, is fitted in a hub, into which the shaft end portion is inserted and which has a hollow portion the inner periphery of which is formed into a tapered shape. This coupling structure is used to transmit a high output, for example, to transmit the output of a steam turbine to a compressor, or to transmit the power of an engine to a propeller shaft.

A taper coupling structure (hereinafter, referred simply to as a coupling structure in some cases) is configured so that when the taper shaft is fitted in or removed from the hub, oil is supplied to a fitting surface between the taper shaft and the hub and thereby the diameter of the hub is expanded (the diameter is increased) to enable the fitting and removing operations. For this purpose, in the coupling structure, an oil path is provided in the taper shaft (or the hub), and an oil groove connected with the oil path is provided in the outer peripheral surface of the taper shaft (or the inner peripheral surface of the hub), whereby oil is supplied to the fitting surface via the oil path and the oil groove.

The fitting and removing operations in the coupling structure can be accomplished not only by using an oil pressure as described above but also by heating the hub to permit heat expansion thereof. In the case where the hub is large, however, the heating work is not easy to do.

Therefore, in the coupling structure, the fitting and removing operations are accomplished mostly by using the oil pressure.

The coupling structure in which the fitting and removing operations are accomplished by using the oil pressure has a problem that oil splashes out of the oil groove and pollutes the surroundings as described in Patent Document 1. Patent Document 1 proposes that the inner peripheral surface of the hub is subjected to microgroove fabrication (the depth: 5/100 mm or smaller). According to Patent Document 1, due to the microgroove fabrication, oil as a perfect fluid is not present on the inner peripheral surface of hub, and resultantly, even if the taper shaft is removed and the oil is exposed to the space, the oil does not splash as a fluid, and remains in a state of sticking to the surface portion.

CITATION LIST

Patent Document

Patent Document 1: Registered Utility Model No. 3054261

SUMMARY OF INVENTION

Technical Problem

The problem of oil splashing can be solved by the proposal of Patent Document 1, and further, by the type of oil used. However, the coupling structure has presented a problem described below.

To facilitate the fitting and removing operations using the oil pressure, conventionally, measures to interpose an O-ring between the taper shaft and the hub have often been adopted. That is, a pair of O-rings is disposed at a predetermined interval in the axial direction, and the oil groove is provided between the paired O-rings. By doing this, the oil supplied via the oil path and the oil groove is accumulated in a closed space formed by the taper shaft, the hub, and the paired O-rings, so that a pressure for increasing the diameter of the hub can easily be attained.

On the other hand, for the coupling structure that does not use an O-ring, the supplied oil is liable to leak from the end portion of the structure, so that a pressure necessary for the fitting or removing operation is difficult to attain between the taper shaft and the hub. If the taper shaft is fitted in or removed from the hub forcedly in this state, a scratch occurs on the outer peripheral surface of the taper shaft and on the inner peripheral surface of the hub.

The present invention has been accomplished to solve the above-described technical problem, and accordingly an object thereof is to provide a taper coupling structure in which a taper shaft can easily be fitted in and removed from a hub without the use of an O-ring.

Solution to Problem

For a coupling structure 100, the conditions for removing a taper shaft 110 from a hub 120 are explained with reference to FIGs. 1A and 1B.

Figure 1A:
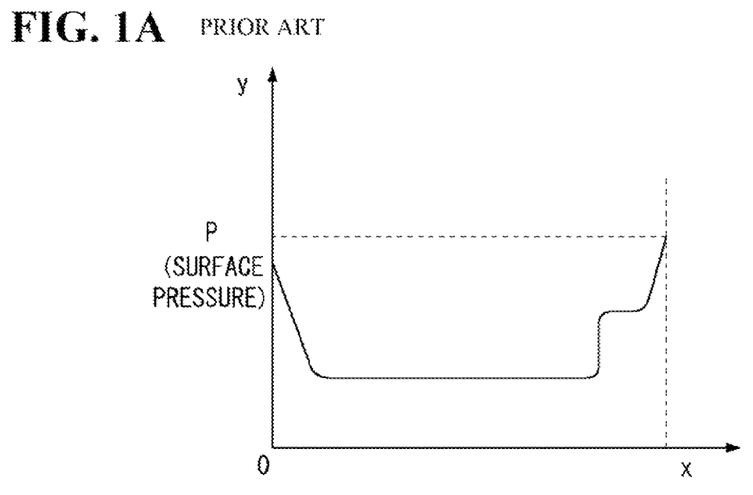
FIGS. 1A and 1B are views for explaining a force acting on a taper coupling structure.
Figure 1B:
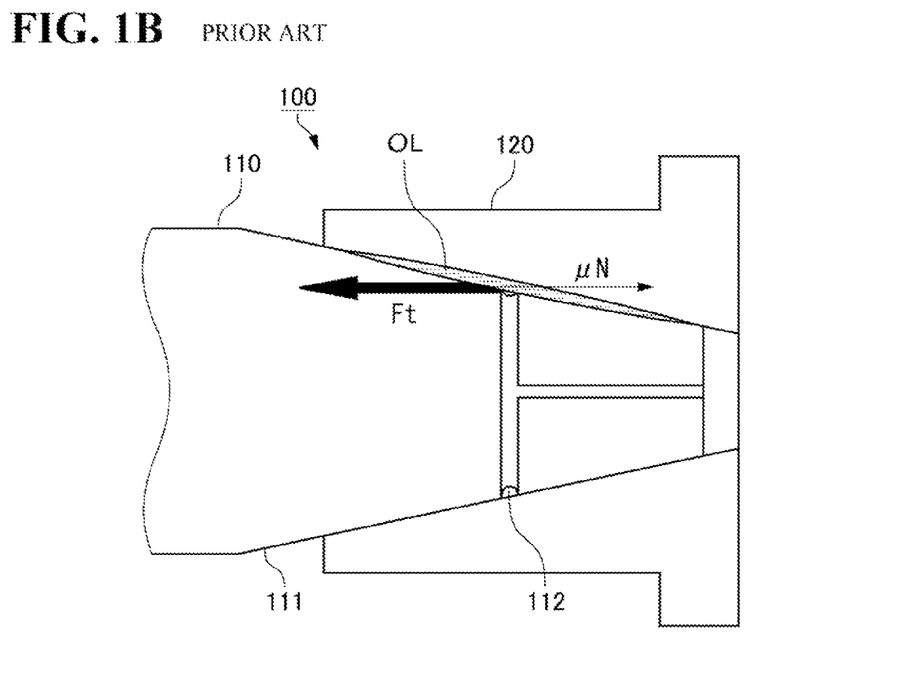

For a coupling structure 100, in the state in which the taper shaft 110 is fitted in the hub 120 as shown in FIG. 1B, the taper shaft 110 receives a pressure (surface pressure) P from the hub 120 as shown in FIG. 1A.

When an oil OL is supplied to a fitting surface between the taper shaft 110 and the hub 120 to remove the taper shaft 110 from the hub 120, a force Ft acts on the taper shaft 110 in the arrow-marked direction in FIG. 1B. On the other hand, a frictional resistance $\mu N$ directed oppositely to Ft acts on the fitting surface between the taper shaft 110 and the hub 120. When Ft exceeds $\mu N$, the taper shaft 110 can be removed from the hub 120. Herein, $\mu$ is a coefficient of dynamic friction, and N is a load based on the surface pressure P.

Figure 2A:
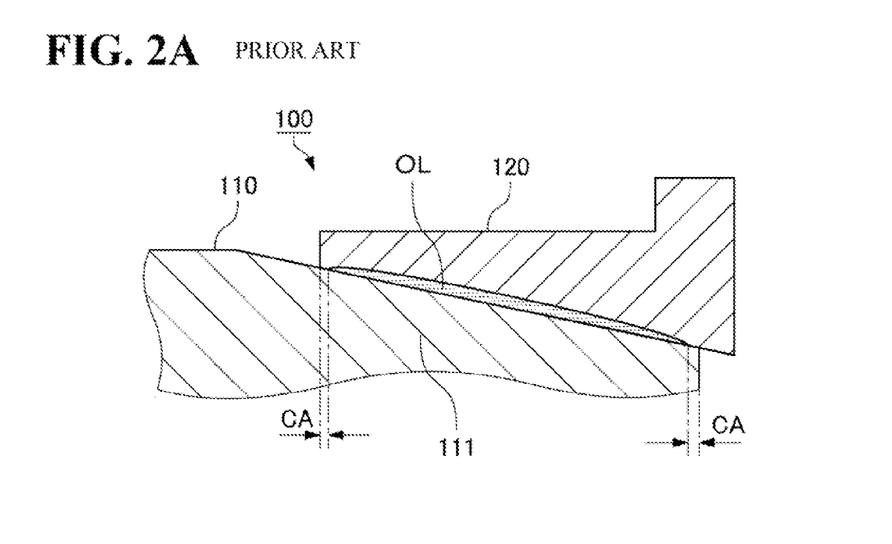
FIGS. 2A and 2B are sectional views showing a state in which oil is supplied to a fitting surface between a taper shaft and a hub of a taper coupling structure.
Figure 2B:
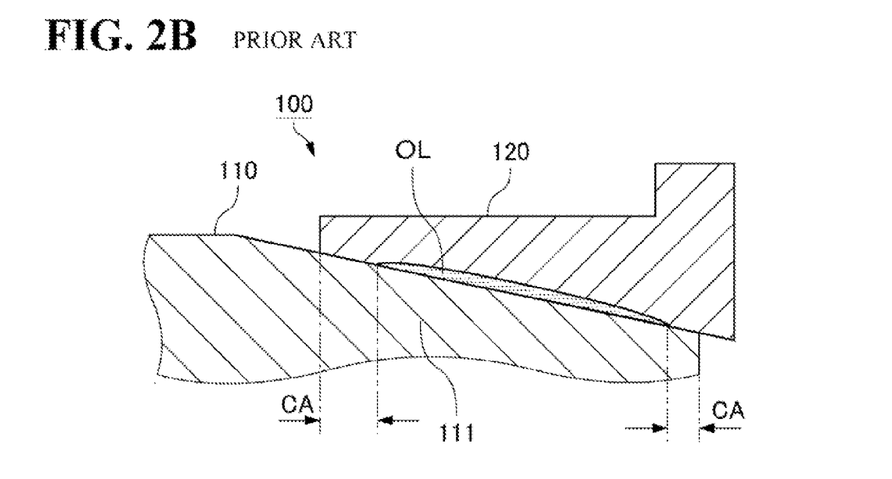

Conventionally, an oil groove 112 has been provided in the outer peripheral surface of the taper shaft 110 (or in the inner peripheral surface of the hub 120) so that the oil OL is supplied to the fitting surface between the taper shaft 110 and the hub 120 via the oil groove 112. Due to the pressure of the supplied oil OL, the inner peripheral surface of the hub 120 is curved into a concave shape as shown in FIGS. 2A and 2B. By expanding the inside diameter of the hub 120 in this manner, the contact area between a taper part 111 and the hub 120 is decreased, and the frictional resistance $\mu N$ acting on the fitting surface between the taper shaft 110 and the hub 120 is reduced. That is, if the contact region CA between the taper part 111 and the hub 120 is small as shown in FIG. 2A, the taper shaft 110 is liable to be removed, and if the contact region CA between the taper part 111 and the hub 120 is large as shown in FIG. 2B, the taper shaft 110 is less liable to be removed.

As shown in FIG. 1A, the surface pressure P is high in both end portions in the axial direction of the hub 120. This is because, in both the end portions in the axial direction of the hub 120, at one end (at the left end in the figure), the diameter of the taper shaft 110 is large, and at the other end (at the right end in the figure), the radial thickness of the hub 120 is large and the rigidity thereof is high. In particular, a flange part on the right end side of the hub 120 has a large thickness, so that the surface pressure at the right end is the highest. Therefore, in order to remove the taper shaft 110, the surface pressure acting on this portion must be increased. However, it is not easy to increase the surface pressure in this portion because the distance from the oil groove 112 is long, and if the surface pressure is increased unreasonably, it is feared that oil leaks from both the end portions. Accordingly, in the present invention, by decreasing the radial rigidity of a region of the hub or the taper shaft corresponding to the portion in which the surface pressure is low, it is proposed, as described below, that even if the surface pressure is low, the taper shaft is easily fitted in and removed from the hub.

The present invention relates to a taper coupling structure in which a taper shaft is fitted in a hub.

The taper shaft has a first end portion and a second end portion, and is provided with a taper part, which is fitted in the hub, on the first end portion side. The diameter of the taper part is decreased continuously from the second end portion toward the first end portion.

The hub includes an inner periphery and an outer periphery, and is formed so that the thickness thereof in the radial direction on the first end portion side is large, and the thickness thereof in the radial direction on the second end portion side is smaller than the thickness thereof on the first end portion side.

The taper coupling structure of the present invention is characterized in that a hollowed part is provided in an end surface on the first end portion side of the taper shaft or an end surface on the first end portion side of the hub.

This hollowed part can be provided in either one or both of the taper shaft and the hub.

The hollowed part provided in the taper shaft is formed so as to be directed to the central axis from a position distant from the outer periphery of the taper shaft toward the central axis. The hollowed part provided in the hub is formed so as to be directed to the outer periphery from a position distant from the inner periphery toward the outer periphery.

The above-described hollowed part is provided continuously in the circumferential direction in the end surface of the taper shaft or the end surface of the hub. Also, the hollowed part is provided uniformly in the radial direction in the end surface of the taper shaft or the end surface of the hub.

Also, in the state in which the taper shaft is fitted in the hub, the hollowed part formed in the taper shaft interferes with the hub in the radial direction, and the hollowed part formed in the hub interferes with the taper shaft in the radial direction.

The hollowed part in accordance with the present invention may have any shape, as shown in the following embodiment, if the radial rigidity of a region of the taper shaft or the hub corresponding to the portion in which the surface pressure is low can be decreased. However, in order to save the manpower for fabricating the end surface of the taper shaft or the end surface of the hub, it is preferable that the hollowed part be made a ring-shaped groove formed continuously in the circumferential direction.

From the viewpoint of ease of fabrication, the hollowed part is preferably provided in the hub. The reason for this is that it is difficult to fabricate the taper shaft having a length as long as, for example, 1 to 2 m by using a general-purpose fabricating machine, and in contrast, the hub can be fabricated by using a general-purpose fabricating machine because the hub has a length considerably shorter than that of the taper shaft.

The present invention also provides a rotating machine including a prime mover for generating a rotational force, a driven machine rotationally driven by the output of the prime mover, and a coupling structure for transmitting the output of the prime mover to the driven machine, to which the above-described taper coupling structure is applied.

Advantageous Effect Of Invention

According to the present invention, there is provided a taper coupling structure in which a taper shaft can easily be fitted in and removed from a hub without the use of an O-ring by decreasing the radial rigidity of a region of the hub or the taper shaft corresponding to the portion in which the surface pressure is low.

DESCRIPTION OF EMBODIMENT

The present invention will now be described in detail based on an embodiment shown in the accompanying drawings.

Figure 3A:
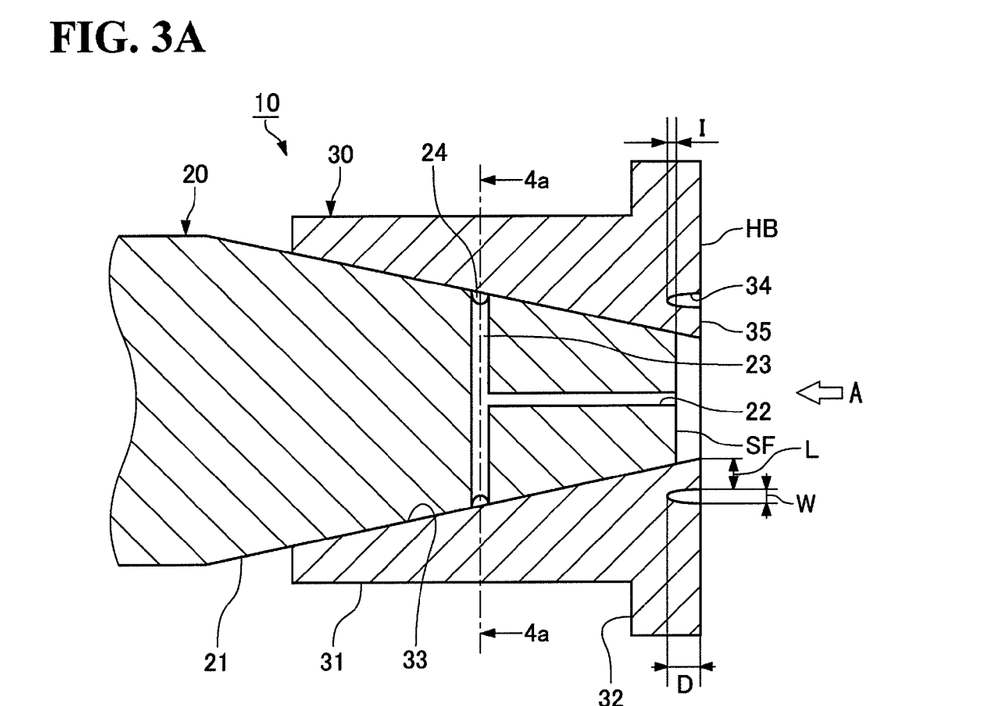
FIGS. 3A and 3B are sectional view and a graph relating to a taper coupling structure in accordance with an embodiment of the present invention, FIG. 3A being a sectional view taken along the line 3a-3a of FIG. 4A, and FIG. 3B being a graph showing the relationship between a surface pressure acting on a fitting surface between a taper shaft and a hub and a position in the axial direction.
Figure 4A:
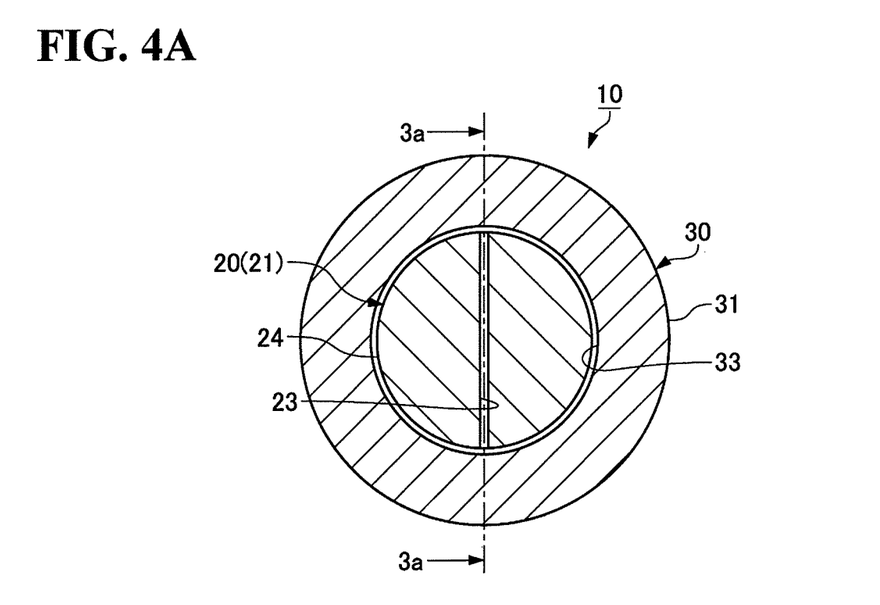
FIGS. 4A and 4B show a taper coupling structure in accordance with an embodiment of the present invention, FIG. 4A being a sectional view taken along the line 4a-4a of FIG. 3A, and FIG. 4B being a front view taken in the direction of the arrow A of FIG. 3A.
Figure 4B:
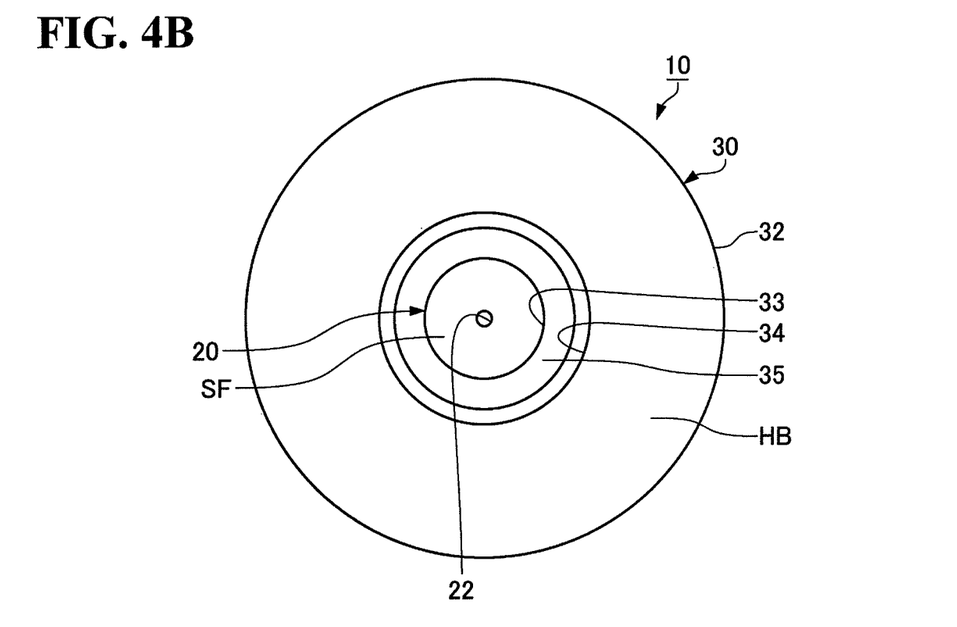

As shown in FIGS. 3A, 4A and 4B, a taper coupling structure 10 includes a taper shaft 20 and a hub 30 in which the taper shaft 20 is fitted. The taper shaft 20 constitutes, for example, the output shaft of a steam turbine, not shown. The hub 30 is connected to, for example, the input shaft of a compressor, not shown, and functions as an element for transmitting the output of the steam turbine to the compressor.

The taper shaft 20 is provided with a taper part 21 the diameter of which decreases continuously toward a front end (a first end portion). In the description below, the side on which the taper shaft 20 is fitted in the hub 30 is defined as "front". That is, in FIG. 3A, the end on the right-hand side of the taper shaft 20 is defined as the front end, and the end on the left-hand side thereof is defined as the rear end. Also, regarding the hub 30, the end on the left-hand side is defined as the front end, and the end on the right-hand side is defined as the rear end.

An axial oil path 22 is formed along the central axis of the taper shaft 20 so as to extend from a front end surface SF of the taper part 21. Also, a radial oil path 23 is formed in the radial direction of the taper part 21. The radial oil path 23 communicates with the axial oil path 22, and both ends of the radial oil path 23 are open to the outer peripheral surface of the taper part 21. Therefore, the oil supplied from a hydraulic power source, not shown, flows along the axial direction in the axial oil path 22, which is open to the front end surface SF of the taper part 21, and then flows along the radial oil path 23 to the outer periphery side in the radial direction. Subsequently, the oil is supplied to the fitting surface between the taper part 21 and the hub 30.

At the position on the outer peripheral surface of the taper part 21, at which the radial oil path 23 is open, an oil groove 24 is formed along the circumferential direction of the taper part 21. The oil flowing out of the openings of the radial oil path 23 flows in the oil groove 24, and thereby is permeated in the circumferential direction of the outer peripheral surface of the taper part 21. If oil is supplied even after the oil groove 24 has been filled with oil, the oil spreads toward the axial direction on the fitting surface between the taper part 21 and the hub 30.

Figure 3B:
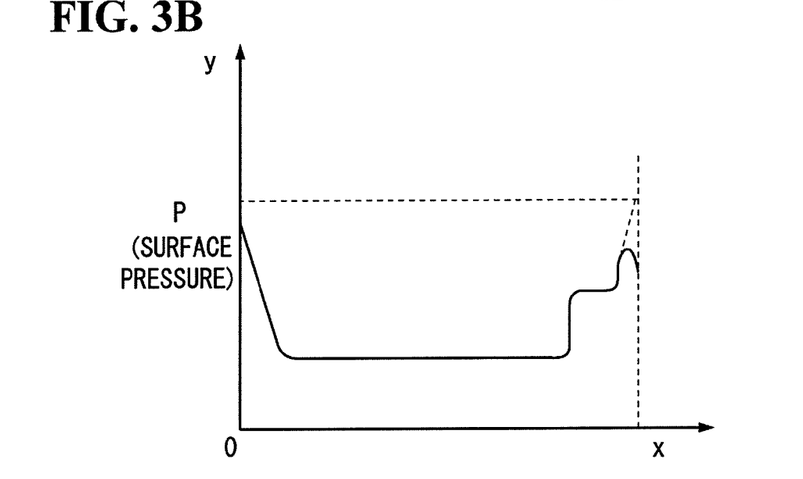

The hub 30 includes a base part 31 having a hollow portion through which the taper part 21 of the taper shaft 20 penetrates, and a highly rigid flange part 32 having an outside diameter larger than that of the base part 31. The flange part 32 is connected to the input shaft of the compressor, to which a force is transmitted, with bolts or the like fastening means. Since the flange part 32 is a portion that receives a high torsional stress from the input shaft, the radial thickness thereof is set so as to be large. Since the flange part 32 has a radial thickness larger than that of the base part 31, the surface pressure P of the taper part 21 received from the flange part 32 is higher than the surface pressure P of the taper part 21 received from the base part 31 as shown in FIG. 3B. The hollow portion of the hub 30 penetrates in the axial direction, and a taper receiving part 33, the diameter of which decreases continuously from the front end of the hub 30 toward the rear end thereof, is formed in the hollow portion.

In a rear end surface HB of the hub 30, a ring-shaped groove 34 is formed. The groove 34 is open to the rear end surface HB of the hub 30, and is formed so as to hollow a part of the flange part 32 from the rear end surface HB toward the front end of the hub 30. The groove 34 is formed so as to be directed to the outer periphery of the hub 30 from a position distant from the inner periphery of the hub 30 toward the outer periphery thereof. Also, the groove 34 is formed continuously in the circumferential direction in the rear end surface HB of the hub 30. Further, the groove 34 is formed uniformly in the radial direction because the width thereof is set so as to be uniform.

An inner shell part 35, which is a portion on the inside of the groove 34 in the radial direction, has a low radial rigidity because of the presence of the groove 34. For this reason, if a force is applied from the hollow portion of the flange part 32 toward the outside in the radial direction, the diameter of the inner shell part 35 is liable to be increased in the radial direction by elastic displacement (deflection). Therefore, the surface pressure at a position corresponding to the portion in which the groove 34 is formed decreases as shown in FIG. 3B, so that the taper shaft 20 can easily be fitted in and removed from the hub 30.

In the present invention, in the state in which the fitting operation of the taper shaft 20 in the hub 30 has been completed, it is necessary for the groove 34 formed in the hub 30 to interfere with the taper shaft 20 in the radial direction. This interference is explained hereunder with reference to FIGS. 5A and 5B.

Figure 5A:
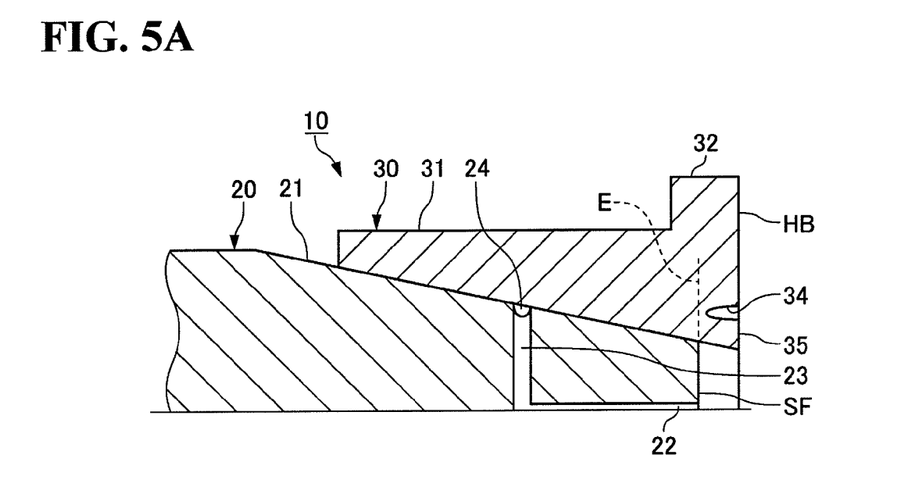
FIGS. 5A and 5B are sectional views for explaining the meaning of "interference in the radial direction" in the present invention, FIG. 5A showing an example of no interference, and FIG. 5B showing an example of interference.

When the taper shaft 20 is fitted in the hub 30, first, as shown in FIG. 5A, the taper shaft 20 is advanced into the hollow portion of the hub 30 until a gap between the taper shaft 20 (the taper part 21) and the hub 30 is eliminated. In this state, the outer peripheral surface of the taper shaft 20 (the taper part 21) and the inner peripheral surface of the hub 30 are merely in contact with each other. This state is called the initial state of fitting. In this initial state, even if the taper shaft 20 is rotated, the taper shaft 20 slides with respect to the hub 30.

Figure 5B:
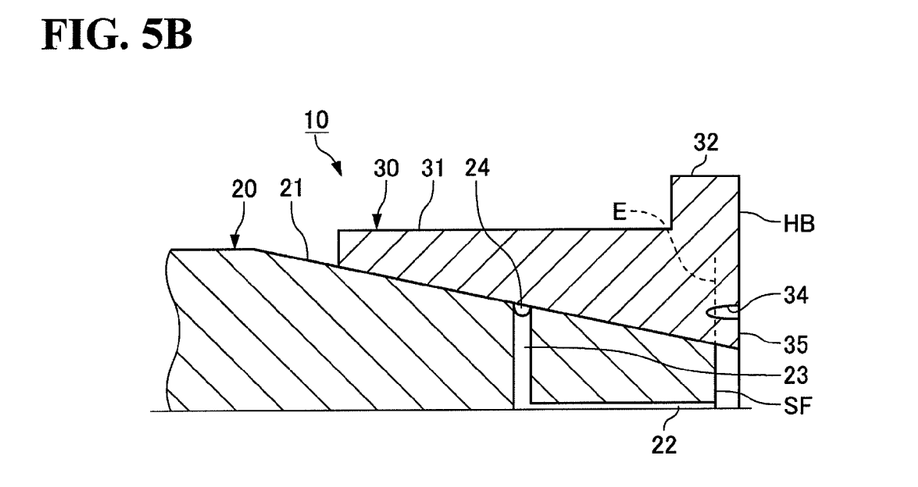

To cause the taper shaft 20 and the hub 30 to perform a function as a coupling, the taper shaft 20 and the hub 30 are pushed to each other in the axial direction so that the fitting depth becomes so deep that a great stress is produced between the outer peripheral surface of the taper shaft 20 (the taper part 21) and the inner peripheral surface of the hub 30. By doing this, a necessary frictional resistance is produced between both the surfaces, and a function as a coupling such that when the taper shaft 20 is rotated, the hub 30 is also rotated by following the taper shaft 20 is fulfilled. This state is the completion of fitting (FIG. 5B). The distance of movement at the time when the taper shaft 20 is pushed into the hub 30 in the axial direction is called a fitting stroke.

The taper coupling structure is configured so that in the state of the completion of fitting, normally, the front end surface SF of the taper shaft 20 retreats to the inside of the hollow portion from the rear end surface HB of the hub 30 as shown in FIG. 5B.

Therefore, in FIG. 5A showing the initial state of fitting, the groove 34 in the hub 30 does not reach an extended line E in the radial direction of the front end surface SF of the taper shaft 20. In this state, the inner shell part 35 is not in contact with the taper part 21, so that the rigidity around the taper part 21 is high. Therefore, assuming that the taper coupling structure 10 has completed the fitting operation when the groove 34 in the hub 30 and the taper shaft 20 are in the positional relationship shown in FIG. 5A, the effect achieved by the formation of the groove 34 cannot be enjoyed.

From the above description, in the case where the groove 34 (hollowed part) is provided in the rear end surface HB of the hub 30, it is necessary to set the depth of the groove 34 considering the fitting stroke.

In contrast, in the state of the completion of fitting shown in FIG. 5B, a part of the groove 34 in the hub 30 is present beyond the extended line E so as to extend to the rear end side of the taper shaft 20. In this state, therefore, the inner shell part 35 having a low rigidity is in contact with the taper part 21, and the inner shell part 35 is liable to be elastically displaced to the outside in the radial direction, so that the effect achieved by the formation of the groove 34 can be enjoyed.

Thus, in order to enjoy the effect of the groove 34 as a hollowed part, it is necessary that the portion whose rigidity is decreased by the formation of the groove 34 (the inner shell part 35) be in contact with the taper part 21. The condition for forming this state is that a part of the groove 34 in the hub 30 is present beyond the extended line E so as to extend to the rear end side of the taper shaft 20. In the present invention, this positional relationship between the groove 34 and the taper shaft 20 is defined as "the groove 34 interferes with the taper shaft 20 in the radial direction".

The reason why the groove 34 is formed continuously in the circumferential direction is that the surface pressure in the circumferential direction is made uniform. For example, assuming that the groove is provided discontinuously in the circumferential direction, the surface pressure is high in the portion in which the groove is not provided, and the surface pressure is low in the portion in which the groove is provided. If the surface pressure is nonuniform in the circumferential direction in this manner, oil may leak from the portion in which the surface pressure is high. In this case, the diameter of the hub 30 cannot be increased as desired. The reason why the groove 34 is formed uniformly in the radial direction is also the same as described above.

According to the findings of the present inventors, the dimensions of the groove 34 should preferably be set as described below (refer to FIG. 3A).

Groove Width W

If only the elastic displacement toward the outside in the radial direction of the inner shell part 35 is considered, the upper and lower limits of the groove width W need not be set. However, since the most general method for forming the groove 34 is to produce a hub stock consisting of the base part 31 and the flange part 32 and thereafter to cut the rear end surface HB thereof, the groove width W should not be made wider than necessary considering the manpower required for cutting. Therefore, in the present invention, it is recommended that the groove width W be made, for example, about several millimeters.

Groove Depth D

If the groove depth D is small, the inner shell part 35 is less liable to be elastically displaced toward the outside in the radial direction.

Also, considering that in the state of the completion of fitting, the groove 34 formed in the hub 30 must interfere with the taper shaft 20 in the radial direction, and the front end surface SF of the taper shaft 20 retreats to the inside of the hollow portion from the rear end surface HB of the hub 30, it is preferable that the groove depth D be made a length including the fitting stroke.

Interference Allowance I

If the distance through which the groove 34 and the taper shaft 20 interfere with each other (the interference allowance I) is too small, the inner shell part 35 is less liable to be elastically displaced toward the outside in the radial direction. Therefore, it is preferable to provide the interference allowance I.

Distance L from Inner Periphery of Front End Surface of Hub 30

The distance L is preferably made short so as not to hinder the elastic displacement of the inner shell part 35 toward the outside in the radial direction.

Groove Shape

In the example shown in FIG. 1 (to FIG. 5B), the bottom portion of the groove 34 is of a round shape. However, the present invention is not limited to this shape as far as the inner shell part 35 is liable to be elastically displaced toward the outside in the radial direction. Therefore, in the present invention, grooves having various shapes, such as a groove 36 having a rectangular cross-sectional shape as shown in FIG. 6A or a groove 37 having a triangular cross-sectional shape as shown in FIG. 6B, can be used.

In the above description, examples of the grooves 34, 36 and 37 have been described as hollowed parts. However, the hollowed part of the present invention is not limited to a groove. In the present invention, for example, as shown in FIG. 6C, the hub 30 may be configured so that a small-diameter part 38 corresponding to the inner shell part is provided at the rear end of the hub 30, and a portion on the outside in the radial direction of the small-diameter part 38 is made a void (hollowed part). Because of its low rigidity, the small-diameter part 38 is liable to be elastically displaced toward the outside in the radial direction like the inner shell part 35.

When the hub 30 having the small-diameter part 38 as in the above-described example is produced, from the viewpoint of fabricating manpower, it is not preferable to form the portion corresponding to the void (hollowed part) on the outside in the radial direction of the small-diameter part 38 by cutting. Normally, the hub 30 is produced through a procedure of cutting after being forged. However, considering the formation of the small-diameter part 38, the hub 30 is produced by forging, whereby the manpower for cutting work can be saved.

Figure 6A:
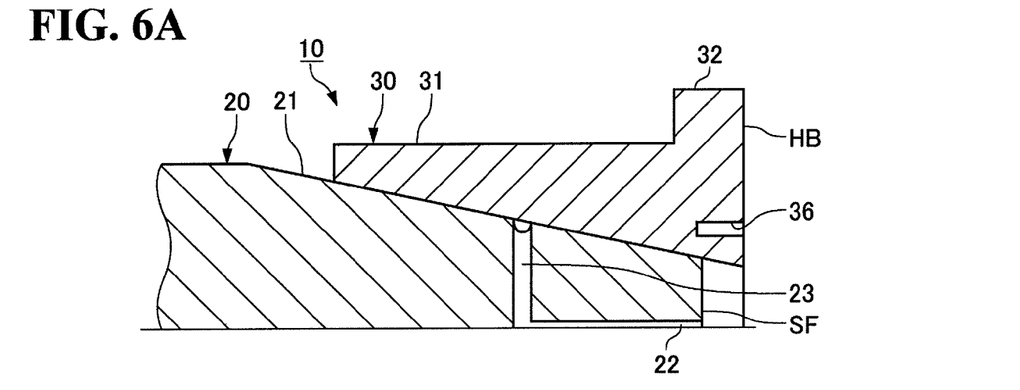
FIGS. 6A, 6B and 6C are sectional views showing other examples of a hollowed part of a taper coupling structure.
Figure 6B:
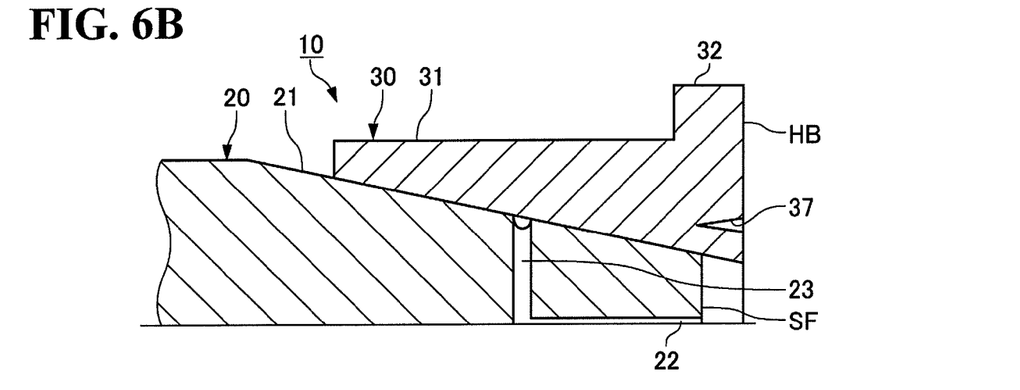
Figure 6C:
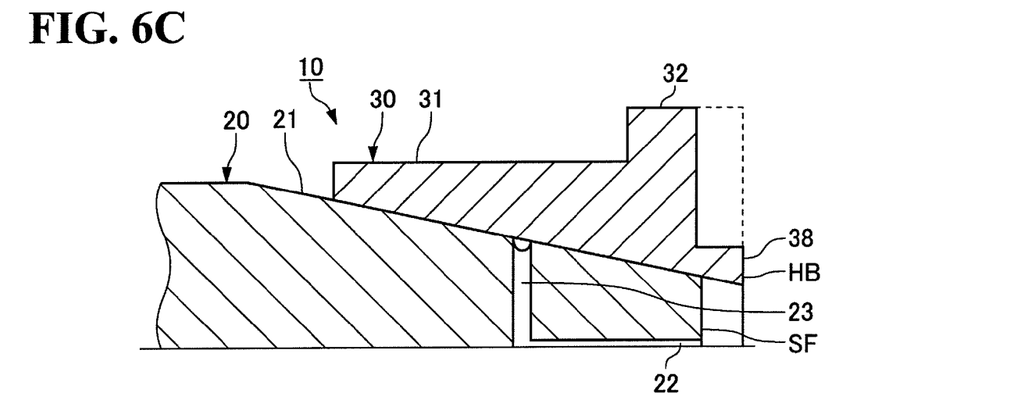

In FIGS. 6A, 6B and 6C, reference signs that are the same as those in FIG. 3A are applied to elements that are the same as those in FIG. 3A. The same is true in FIGS. 7A, 7B and 8A.

Figure 7A:
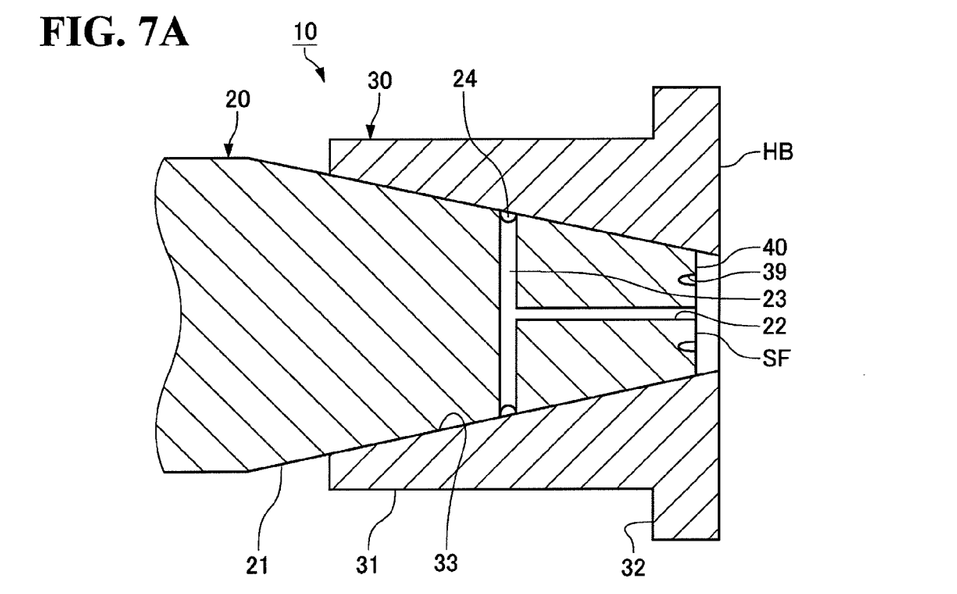
FIGS. 7A and 7B are sectional views showing examples of a taper coupling structure provided with a hollowed part in a taper shaft.

In the above description, an example in which a groove (hollowed part) is provided in the hub 30 has been described. However, the present invention is not limited to this example. As shown in FIG. 7A, a groove 39 can be provided in the front end surface SF of the taper shaft 20. As shown in FIG. 7, the groove 39 is formed so as to be directed to the central axis from a position distant from the outer periphery of the taper part 21 toward the central axis. In this mode in which the groove 39 is provided in the taper shaft 20, the radial rigidity of an outer shell part 40, which is a portion on the outside of the groove 39 in the radial direction, is low because of the presence of the groove 39. For this reason, if a force is applied to the inside in the radial direction of the taper part 21 from the outer periphery thereof, that is, toward the central axis of the taper shaft 20, the diameter of the taper part 21 is liable to be decreased in the radial direction by elastic displacement (deflection). Therefore, in the same way as shown in FIG. 3B, the surface pressure at a position corresponding to the portion in which the groove 39 is formed decreases, so that the taper shaft 20 can easily be fitted in and removed from the hub 30.

Like the groove 34, the groove 39 is also required to be formed so as to be continuous in the circumferential direction in the front end surface SF of the taper shaft 20 and so as to be uniform in the radial direction because of the width thereof set so as to be uniform. Also, the above-described groove width W, groove depth D, interference allowance I, and groove shape can be applied likewise to the groove 39.

Figure 7B:
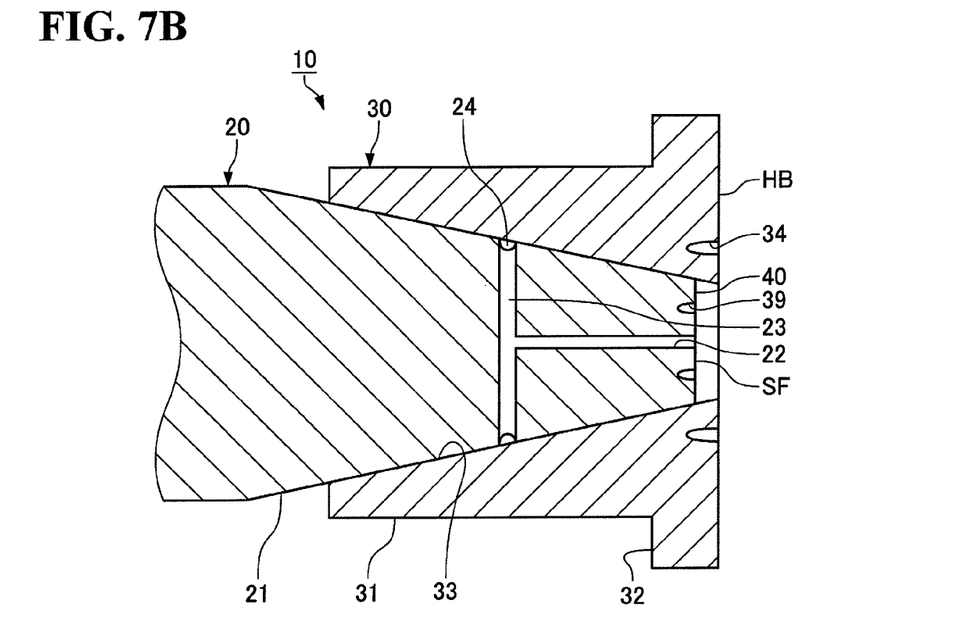

Further, as shown in FIG. 7B, both of the taper shaft 20 and the hub 30 are provided with the groove 39 and the groove 34, respectively, whereby the surface pressure can be reduced further.

In the case where the groove 39 is provided in the taper shaft 20, an advantage of being capable of decreasing the groove depth D can be offered. That is, when the taper shaft 20 is fitted in the hub 30, since the groove 39 of the taper shaft 20 is formed in the front end surface SF thereof, the groove 39 interferes with the hub 30, which is a fitting mate, in the radial direction from the initial stage of fitting. Therefore, the groove depth D of the groove 39 in the taper shaft 20 can be decreased because the front end surface SF of the taper shaft 20 retreats to the inside of the hollow portion from the rear end surface HB of the hub 30 and because the fitting stroke need not be considered.

In some cases, however, it is difficult to fabricate the groove 39 by using a general-purpose fabricating machine because the taper shaft 20 has a long length. Therefore, from the viewpoint of ease of fabrication, it can be said that the groove 34 (hollowed part) is preferably provided in the hub 30.

Figure 8A:
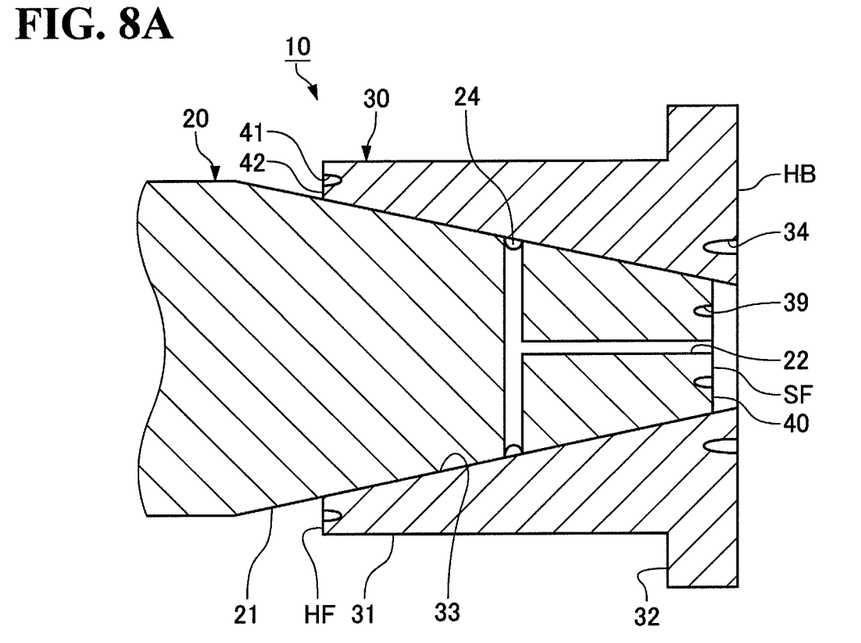
FIG. 8A is a sectional view showing an example of a taper coupling structure provided with a hollowed part in the front end surface of a hub.
Figure 8B:
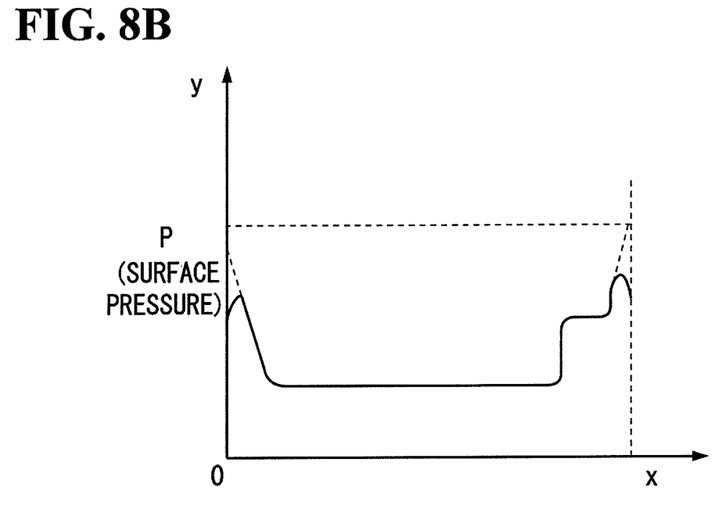
FIG. 8B is a graph showing the relationship between a surface pressure generated on the fitting surface between a taper shaft and the hub of the taper coupling structure shown in FIG. 8A and a position in the axial direction.

In the above description, an example in which the groove 34 is provided in the rear end surface HB of the hub 30 as a hollowed part, and the groove 39 is provided in the front end surface SF of the taper shaft 20 as a hollowed part has been described. However, as shown in FIG. 8A, a groove 41 can also be provided in a front end surface HF of the hub 30 as a hollowed part. In this case, the radial rigidity of an inner shell part 42, which is a portion on the inside of the groove 41 in the radial direction, is low because of the presence of the groove 41. For this reason, if a force is applied to the outside in the radial direction from the hollow portion of the base part 31, the diameter of the inner shell part 42 is liable to be increased in the radial direction by elastic displacement (deflection). Therefore, as shown in FIG. 8B, the surface pressure at a position corresponding to the portion in which the groove 41 is formed decreases, so that the taper shaft 20 can easily be fitted in and removed from the hub 30.

In the present invention, a hollowed part need not necessarily be provided in the front end surface HF of the hub 30. As described above, the surface pressure is high on the rear end side of the hub 30 (on the front end side of the taper shaft 20). Therefore, by providing a hollowed part in the rear end surface HB of the hub 30 or in the front end surface SF of the taper shaft 20, the object of the present invention such that the taper shaft 20 can easily be fitted in and removed from the hub 30 can be achieved. For this reason, to provide a hollowed part in the front end surface HF of the hub 30 is a further preferable mode of the present invention.

Figure 9:
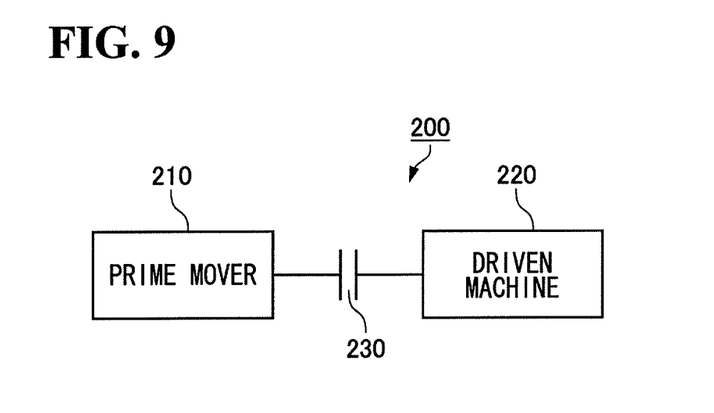
FIG. 9 is a diagram showing a schematic configuration of a rotating machine for which a taper coupling structure is used.

As shown in FIG. 9, in a rotating machine 200 including a prime mover 210 for generating a rotational force and a driven machine 220 rotationally driven by the output of the prime mover 210, the taper coupling structure 10 explained above is applied to a coupling structure 230 for transmitting the output of the prime mover 210 to the driven machine 220. In this case, either one of the rotating shaft on the prime mover 210 side and the rotating shaft on the driven machine 220 side has a tapered shaft end, and a hub is provided on the other thereof, whereby the taper coupling structure 230 is formed. As the prime mover 210, a steam turbine, gas turbine, internal combustion engine, electric motor, or the like is used. Also, as the driven machine 220, a compressor, wheel, propeller, or the like is used. Between the prime mover 210 and the driven machine 220 side, a speed-increasing/speed-variable gear can be provided. In this case, the shaft end of the rotating shaft of the speed-increasing/speed-variable gear may be of a tapered shape or may be provided with a hub.

The above is a description of the embodiment of the present invention. Besides, the configurations described in the above-described embodiment can be selected, or can be changed to other configurations as appropriate without departing from the spirit and scope of the present invention.

For example, the oil groove 24 can be provided in the hub 30, or the oil path can be provided in the hub 30. Also, in the above description, the removing operation has been explained. However, it is a matter of course that the present invention works effectively in the fitting operation.

REFERENCE SIGNS LIST

10 . . . taper coupling structure, 20 . . . taper shaft, 21 . . . taper part, 30 . . . hub, 31 . . . base part, 32 . . . flange part, 33 . . . taper receiving part, 34, 36, 37, 39, 41 . . . groove, 35, 42 . . . inner shell part, 38 . . . small-diameter part, 40 . . . outer shell part, 200 . . . rotating machine, 210 . . . prime mover, 220 . . . driven machine, 230 . . . coupling structure

The invention claimed is:

1. A taper coupling structure comprising a hub and a taper shaft to be fitted in the hub, wherein
the taper shaft has a first end portion and a second end portion, and is provided with a taper part, which is fitted in the hub, on a first end portion side,
a diameter of the taper part is decreased continuously toward the first end portion,
the hub includes an inner periphery and an outer periphery, and is formed so that a thickness thereof in a radial direction at a first end portion side is larger than the thickness thereof in the radial direction on a second end portion side,
a first annular groove is provided in an end surface on the first end portion side of the taper shaft,
a second annular groove is provided in an end surface on the first end portion side of the hub,
the first annular groove is provided continuously in a circumferential direction and of a uniform width in a radial direction in the end surface of the taper shaft,
the second annular groove is provided continuously in a circumferential direction and of a uniform width in a radial direction in the end surface of the hub,
the first annular groove provided in the taper shaft divides the first end portion side of the taper shaft into a first outer circumferential end portion that surrounds the first annular groove and a first inner circumferential end portion that is surrounded by the first annular groove, and
the second annular groove provided in the hub divides the first end portion side of the hub into a second outer circumferential end portion that surrounds the second annular groove and a second inner circumferential end portion that is surrounded by the second annular groove;
whereby the first and second annular grooves allow for inward and outward elastic displacement of the first outer circumferential end portion of the taper shaft and the second inner circumferential end portion of the hub, respectively, to reduce surface pressure between the taper shaft and hub.

2. The taper coupling structure according to claim 1,
wherein in a state in which a fitting of the taper shaft in the hub is completed, the first annular groove in the taper shaft interferes with the hub in the radial direction, and the second annular groove in the hub interferes with the taper shaft in the radial direction.

3. The taper coupling structure according to claim 2, wherein an annular groove is further provided in an end surface on a second end portion side of the hub.

4. A rotating machine comprising:
a prime mover for generating a rotational force;
a driven machine rotationally driven by an the output of the prime mover; and
a coupling structure for transmitting the output of the prime mover to the driven machine, wherein
the coupling structure comprises the taper coupling structure described in claim 3.

5. A rotating machine comprising:
a prime mover for generating a rotational force;
a driven machine rotationally driven by an output of the prime mover; and
a coupling structure for transmitting the output of the prime mover to the driven machine, wherein
the coupling structure comprises the taper coupling structure described in claim 2.

* * * * *